United States Patent Office 3,667,935

Patented June 6, 1972

3,667,935

PROCESS FOR PREPARING NITROGEN-FREE PLATINUM POWDERS

Oliver A. Short, Wilmington, Del., assignor to E. I. du Pont de Nemours and Company, Wilmington, Del.

No Drawing. Continuation-in-part of abandoned application Ser. No. 756,394, Aug. 30, 1968. This application Feb. 4, 1971, Ser. No. 112,789

Int. Cl. C22b 11/04

U.S. Cl. 75—109 1 Claim

ABSTRACT OF THE DISCLOSURE

Nitrogen-free platinum powders are prepared by precipitation from an aqueous platinum chloride solution, with zinc and hydrochloric acid. This nitrogen-free platinum powder is relatively coarse and can be used in the production of various electrical circuit structures.

CROSS-REFERENCE TO RELATED APPLICATION

This application is a continuation-in-part of my copending application Ser. No. 756,394, filed Aug. 30, 1968, now abandoned.

BACKGROUND OF THE INVENTION

This invention relates to platinum powder, and, more particularly, to a process for producing nitrogen-free platinum powder.

Commercially available platinum powders prepared by conventional precipitation techniques are extremely fine (i.e., 0.01–0.1 micron), catalytically active and contain substantial quantities of certain gases. The presence of these gases in the platinum powders causes bubbling, blistering and delamination of monolithic structures when used to produce such structures, particularly when the structures involve buried conductors which are fired near the sintering temperature of alumina (e.g., above 1500° C.). Additionally, such platinum powders are not extremely useful in printed circuits unless the platinum powders are mixed with other metals or otherwise modified to (1) reduce catalytic activity during early stages of firing when organic vapors are present and (2) to prevent agglomeration of the very fine powders at the high temperatures of firing.

Thus, a new type of platinum powder is needed which is fine enough to use in printed circuit inks but still coarse enough to inhibit catalytic activity and to produce a smooth compact print when fired with a substrate in the production of printed circuits. More particularly, relatively coarse nitrogen-free platinum powders are necessary in the production of multilayer ceramic capacitors and other monolithic multilayer circuit structures, such as those described by Schwartz et al., "Laminated Ceramics," Institute of Electrical and Electronics Engineers, Inc., Proceedings 1967 Electronic Component Conference.

SUMMARY OF THE INVENTION

This invention relates to a highly useful process for preparing platinum powders which may be used in the formulation of metallizing compositions and in the production of printed circuit structures. In particular, the platinum powder of this invention is relatively coarse and free from nitrogen.

Accordingly, the process of this invention comprises (a) preparing an aqueous acidic platinum chloride solution containing about 10–30 grams of platinum per liter; (b) precipitating platinum from the solution by adding zinc to the solution at the rate of about 10–15 grams per minute, until an excess of zinc has been added; (c) adding hydrochloric acid to the solution until no further chemical reaction is observed to dissolve excess zinc; and (d) separating the nitrogen-free platinum powder precipitate from the solution; the powder has a surface area within the range of 0.1–1 m.²/gm.

Metallizing compositions comprising a nitrogen-free platinum powder, having a surface area of 0.1–1 m.²/gm., dispersed in an inert liquid vehicle are prepared. Ceramic substrates having printed and fired thereon the above metallizing compositions are also part of this invention.

This new platinum powder does not possess the previously described disadvantages of the prior art platinum powders. Consequently, this new platinum powder is useful in the formulation of metallizing compositions which are used to print electrodes in monolithic capacitors and for use with other organic bonded, unfired ceramic substrates that are to be fired above 1500° C. The new platinum powder of this invention may also be used between layers of alumina tape to produce "buried conductors."

DETAILED DESCRIPTION

More specifically, an aqueous acidic platinum chloride solution is prepared by dissolving platinum sponge in a mixture of nitric and hydrochloric acids (aqua regia) in a reaction vessel and subsequently decomposing the nitric acid by continued boiling and repeated additions of hydrochloric acid. This acidic solution of platinum chloride is then diluted with water to contain the prescribed concentration of platinum. The prescribed platinum concentration is important in obtaining the desired particle size platinum powder. Zinc, preferably in the form of a powder, is added to this diluted solution in small portions at the above rate, to prevent excess frothing from hydrogen that is evolved. The zinc powder is added until there is no more frothing; this indicates complete reaction wherein all of the platinum powder is precipitated. However, the platinum is generally contaminated with unreacted zinc. Therefore, hydrochloric acid must be added to the reaction vessel to dissolve all of the unreacted zinc. The end point of this reaction, when all the zinc has dissolved, is determined by a cessation of bubbling. The reaction vessel now contains platinum powder and an aqueous solution of HCl and $ZnCl_2$. Then the platinum powder is filtered, washed free of zinc chloride and hydrochloric acid, and dried.

The platinum powder precipitate has a surface area, as measured by nitrogen or krypton adsorption, of about 0.1–1 m.²/gm. The preferred particle size is within the range of 0.2–0.6 m.²/gm., which is about equivalent to 0.5–1.5 microns.

The important process parameters of this invention, in addition to the concentration of platinum in the aqueous acidic solution, involve the use of zinc to produce a nitrogen-free platinum powder, and the rate of zinc addition. Various reducing agents commonly used for precious metals were tried but none produced the results which are obtained from using zinc. The conventional reducing agents, including iron sulfate, oxalic acid, hydroquinone and sodium sulfite, did not produce the desired results. It was found very unexpectedly that zinc was the only material which produced the desired results. If the zinc is added in large amounts or very rapidly, the precipitation reaction becomes too violent.

The metallizing compositions made with the platinum powders of this invention comprise nitrogen-free platinum, and optionally, other metals and/or an inorganic binder. Typical of such other metals are palladium, silver, gold, mercury, ruthenium, etc. The metallizing composition of this invention will usually, although not necessarily, be dispersed in an inert vehicle to form a paint or paste for application to ceramic substrates. The proportion of vehicle to metal may vary considerably depending upon the manner in which the paint or paste is to be applied and the kind of vehicle used. Generally, 1–96% by weight of solids (metals, inorganic binder) and 4–99% by weight of vehicle will be used to produce a paint or paste of the desired consistency.

Any liquid, preferably one that is inert towards the metal powder, may be employed as the vehicle. Water or any of various organic liquids, with or without resin binders, thickening and/or stabilizing agents, and/or other common additives may be utilized as the vehicle. Examples of organic liquids that can be used are the higher alcohols, esters of alcohols, for example, the acetates and propionates, the terpenes such as pine oil, alpha- and beta-terpineol and the like; and solutions of resin binders such as the polymethacrylates of lower alcohols, or solutions of ethyl cellulose, and solvents such as pine oil and the monobutyl ether of ethylene glycol monoacetate (butyl—O—$CH_2CH_2$—$OCOCH_3$)

A preferred vehicle for use in this invention consists of: hydrogenated rosin, ethyl cellulose, beta-terpineol, and kerosene. Such vehicles are disclosed in my copending application Serial Number 617,855, filed Feb. 28, 1967, now U.S. Pat. 3,536,508. Also, any of the other vehicles disclosed in that application may be used. The vehicle may contain or be composed of volatile liquids to promote fast setting after applications; or it may contain waxes, thermoplastic resins or the like materials which are thermofluid so that the vehicle-containing composition may be applied at an elevated temperatures to a relatively cold ceramic body upon which the composition sets immediately.

While metallizing compositions which are applied to green (unfired) dielectric substrates customarily consist essentially of metal powder and a vehicle, the metallizing compositions which are applied to prefired ceramic substrates usually contain an inorganic binder in addition to the metal powder and inert vehicle. The inorganic binders used in the metallizing compositions of this invention may be composed of any glass or ceramic material which will melt at a temperature lower than the melting point of the metal powder with which it is used and which will adhere well to the substrate onto which the metallizing composition is applied. Any inorganic material which serves to bind the metals to the substrate can be used as the inorganic binder component. The inorganic binder can be any of the glass frits employed in metallizing compositions. Such frits are generally prepared by melting a glass batch composed of the desired metal oxides, or compounds which will produce the glass during melting, and pouring the melt into water. The coarse frit is then milled to a powder of the desired fineness. Larsen and Short U.S. Pat. No. 2,822,279 and Hoffman U.S. Pat. No. 3,207,706 describe some frit compositions which can be employed either alone or in combination with glass wetting agents, such as bismuth oxide. Typical frit compositions usable as binders in the compositions of this invention include lead borate, lead slicate, lead borosilicate and sodium-cadmium borosilicate frits.

When inorganic binders are present in the metallizing compositions, the binders should always be present in sufficient quantities to provide adequate adhesion, for example, in amounts equal to or in excess of 1% of the combined amount of metal powder and inorganic binder, also known as the solids content of the metallizing composition. These metal compositions can be composed of 1–99% (solids) inorganic binder; the amount of inorganic binder, for purposes of this invention, will control the degree of conductivity and resistivity of the fired products and, consequently, the ultimate use of such products.

The present metallizing compositions can be printed and fired on various types of ceramic dielectrics including those composed of forsterite, steatite, titanium oxide, barium titanate, bismuth stannate, alumina or zircon porcelain. Any other conventional unfired (green) dielectrics or prefired dielectrics can be used.

Example 1 is given to illustrate in detail the preferred method of preparing platinum powders in accordance with the teachings of this invention. It is pointed out that these details are not to be taken as limitations of this invention. In the examples and elsewhere in the specification, all parts, ratios and percentages of materials or components are by weight.

EXAMPLE 1

A 200-gram sample of platinum was dissolved in 1,000 ml. aqua regia in a reaction vessel; the nitric acid was subsequently decomposed by continued boiling and repeated additions of hydrochloric acid. This solution was diluted with distilled water to contain about 20 grams per liter of platinum. Then zinc powder was added slowly in small portions to the solution at the rate of about 12 grams per minute; the additions of zinc were continued until no more frothing was observed. A gray platinum precipitate continually formed throughout this precipitation reaction.

Small amounts of hydrochloric acid were then added to the reaction vessel to dissolve the unreacted zinc from the solution and the precipitated platinum. When all bubbling had ceased, the hydrochloric acid additions were stopped. Then the precipitate was filtered, washed free of hydrochloric acid and zinc chloride, and dried.

The precipitated platinum powder had a surface area of about 0.5 $m^2/gm$.

EXAMPLE 2

The gray platinum powder of Example 1 was dispersed in an inert vehicle consisting of 30% hydrogenated rosin, 6% ethyl cellulose, 2.5% beta-terpineol and 61.5% kerrosene. The weight ratio of metal powder to vehicle was 60% metal and 40% vehicle. The metallizing composition was printed by screen stencilled techniques on a polymethyl methacrylate (PMA) resin bonded ceramic sheets. The sheets contained 10% PMA, 79.4% barium titanate and 10.6% bismuth stannate. After drying, ten printed sheets were stacked with alternate electrodes slightly offset and the edges were trimmed to expose alternate electrodes on opposite sides of the stack. The stack was then fired over a period of several days, finally reaching a temperature of 1300° C. After firing, the stack was coated with a fired-on silver conductor on each end and refired to 760° C. Copper wires were then soldered to the silver and a measurement was made for capacitance and dissipation factor. For the particular size and pattern of the ceramic, the capacitance was 0.1 microfarad and the dissipation factor less than 1%. Of greater importance, there were no bubbles or blisters in the fired capacitor, nor was there any evidence of delamination when a cross section of the unit was examined.

COMPARATIVE EXAMPLE A

A similar metallizing composition was prepared in accordance with Example 2, except that platinum "black" was used instead of the platinum which was prepared in Example 1. The platinum "black" had an average particle size of 0.05 micron, less than that of the present invention. Some of the resulting capacitors showed evidence of blistering; others were severely cracked and delaminated. The intact units were measured for capacitance and dissipation; the results showed very wide scatter, but the capacitor did not have as large a capacitance or as low a dissipation factor as in Example 2.

EXAMPLE 3

The gray platinum powder dispersion of Example 1 was printed onto a polymethyl methacrylate bonded, green alumina substrate in the form of a circuit pattern. A second layer of green alumina was placed over the printed circuit and the two sheets of alumina were pressed together under a pressure of 10,000 p.s.i. This "buried conductor" was fired at about 1600° C. to form an intact, bubble-free circuit board.

COMPARATIVE EXAMPLE B

A "buried conductor" was prepared as described in Example 3 except a conventional (not "nitrogen-free") platinum powder was used. This platinum powder had been precipitated by reduction with hydrazine in the presence of ammonia. The resulting "buried conductor" exhibited a printed circuit having a series of bubbles and blisters. It was determined, through the use of a mass spectrograph, that the evolution of nitrogen from the platinum powder caused the bubbles and blisters.

What I claim is:

1. A process for the production of nitrogen-free platinum powder having a surface area within the range of 0.1–1 $m.^2/gm.$, said process comprising the steps of:

(a) preparing an aqueous acidic platinum chloride solution containing an amount of platinum in the range of about 10–30 grams per liter;

(b) precipitating platinum from the solution by adding zinc to the solution at a rate in the range of about 10–15 grams per minute, until an excess of zinc has been added;

(c) adding hydrochloric acid to the solution until no further chemical reaction is observed to dissolve excess zinc; and (d) separating the nitrogen-free platinum powder precipitate from the solution.

References Cited

UNITED STATES PATENTS

| | | | |
|---|---|---|---|
| 1,649,786 | 11/1927 | Smith | 75—109 |
| 1,876,943 | 9/1932 | Hull | 75—109 |
| 3,390,981 | 7/1968 | Hoffman | 75—121 X |

L. DEWAYNE RUTLEDGE, Primary Examiner

G. T. OZAKI, Assistant Examiner

U.S. Cl. X.R.

75—.5 AB, 121